Jan. 9, 1940.   G. T. RONK   2,186,593
RAILWAY AND HIGHWAY TRAILER
Filed Nov. 6, 1936
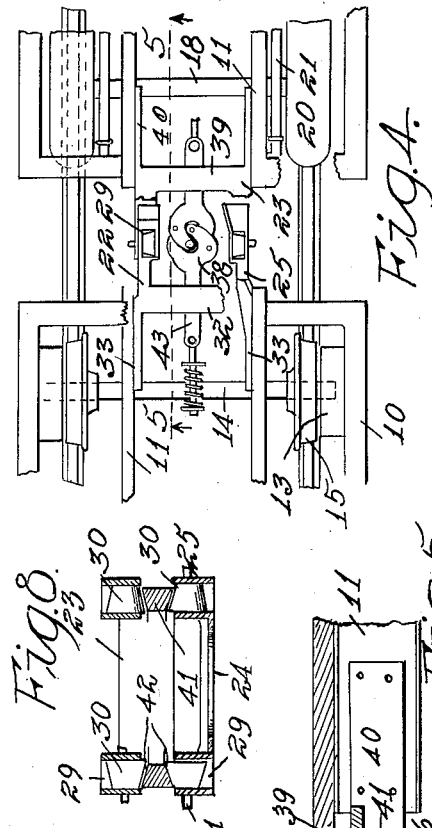
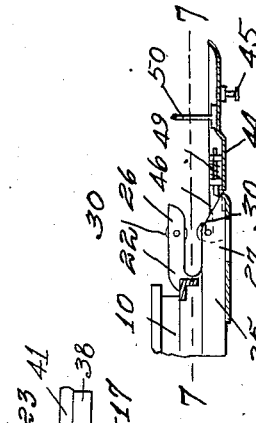
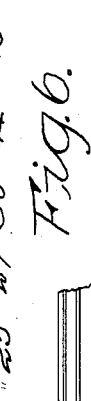
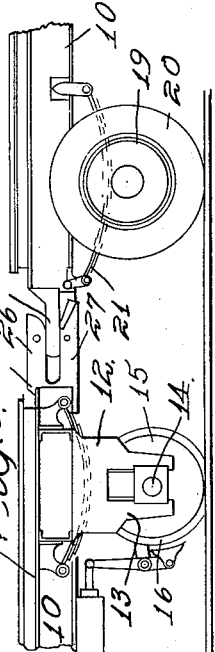
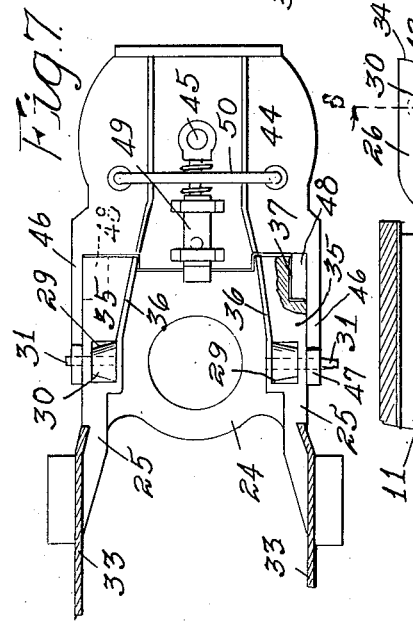
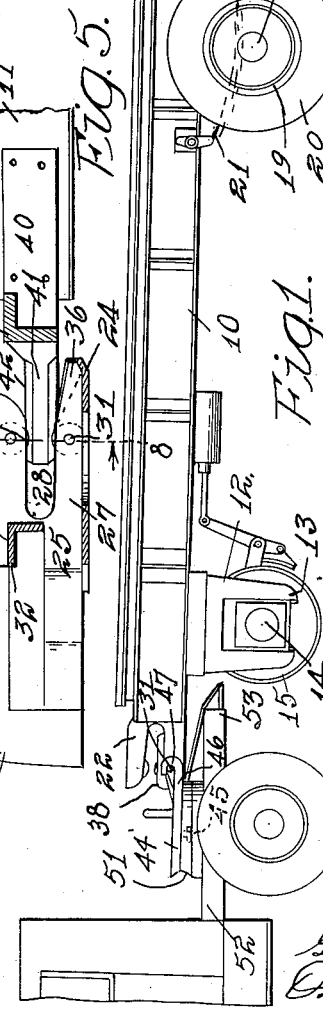
Inventor
George T. Ronk Patented Jan. 9, 1940

2,186,593

UNITED STATES PATENT OFFICE 2,186,593

RAILWAY AND HIGHWAY TRAILER

George T. Ronk, Lanark, Ill.

Application November 6, 1936, Serial No. 109,488

22 Claims. (Cl. 105—215)

This invention relates to improvements in trailers adapted to be used over either a highway or over a railway track, and of the type generally known as a semi-trailer. In operation, with trailers of this type one end of the trailer is supported by the preceding car or traction device, with the weight of the opposite end resting on the corresponding set of wheels. A single trailer connected to a tractor operates quite successfully due to the fact that the weight of the tractor is sufficient to stabilize lateral movement of the supported end of the trailer. However, when a series of trailers are connected together to form what is commonly known as an articulated train, considerable difficulty arises due to the lateral swinging or oscillating movement of the connected ends of the cars, leaving the entire strain of the lateral movement of the connected ends of two cars to be carried by a single wheel flange. Therefore, one of the objects of my invention is to provide in combination railway and highway semi-trailers, improved means for reducing the tendency of the inherent vertical and lateral oscillations of the connected ends of the cars.

More specifically, it is the object of my invention to provide in combination railway and highway trailers of the type above described, simple and comparatively inexpensive means wherein a simple car foundation may be mounted with a standard highway traction gear at one end and with a standard railway traction gear at the other end, wherein the trailer may be operated over a highway with one end supported by the highway wheels and the other supported by the adjacent end of a traction device, the supported end being elevated by any well known means, or wherein the trailer may be operated over a railway track by attaching its opposite end to the adjacent end of the traction device with both sets of wheels engaging the rails of the railway track, with a portion of the weight of the highway end of the trailer carried by the traction device and a portion by the highway wheels, whereby the highway wheels will be permitted to frictionally engage the rails to move laterally thereof to thereby reduce the lateral oscillations.

A further object is to provide, in connection with semi-trailers of the type above referred to, improved means for guiding the elevated end of the trailer laterally to maintain the highway wheels on the tracks and at the same time permit the standard car couples devices to be used, wherein the lost motion movement of the coupler may also be accommodated.

A further object of my invention is to provide auxiliary coupling means or adapter whereby one end of my improved trailer may be coupled to one end of another trailer of the same type, or wherein one end of my improved trailer may be coupled to a standard coupling device of another type, or yet a third type, provided the said adapters have a common attaching means to my improved trailer.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a side elevation of my improved trailer showing the manner in which it is connected to a highway tractor truck.

Figure 2 is a side elevation of segmental portions of a railway tractor and of my improved truck, showing the manner in which they are coupled.

Figure 3 is a side elevation of segmental portions of my improved trailer showing the manner in which the trailers are connected together and operated in articulation.

Figure 4 is a diagrammatical plan view of the coupled ends of two segmental portions of trailers, portions of the frame work being broken away.

Figure 5 is an enlarged detail sectional view taken on the line 5—5 of Figure 4.

Figure 6 is a longitudinal sectional view of the carrier guiding device showing the manner in which the auxiliary coupling element is attached thereto.

Figure 7 is an enlarged detail sectional view taken on the line 7—7 of Figure 6.

Figure 8 is a detail sectional view taken on the line 8—8 of Figure 5.

My improved car comprises a frame 10 on which any type of body may be mounted, said frame having central and parallel sills 11 extending from one end to the other to which the coupling and guiding mechanism may be attached. Near one end of the frame 10 I have provided a railway gear 12 including pedestals 13, axles 14 and railways wheels 15 having flanges 16. The frame 10 is yieldably supported on the axles 14 in the usual manner. The opposite end of the frame 10 is provided with a highway gear 17, including an axle 18, and wheels 19 carried thereby, said wheels having preferably rubber or pneumatic tires 20, said end of the frame 10 being carried by springs 21.

At the end of the frame 10 provided with a railway gear is what I shall term a carrier guide device 22, and at the opposite end of the frame 10 I have provided what I shall term a rider guide device 23. The carrier guide comprises a plate 24 having each of its side edges provided with upright frame members 25, one end of said guide devices terminating in an upper roller support 26 and a lower roller support 27, said supports being spaced apart to provide a notch or slot 28. Each of the roller supports is provided with an opening 29 in which is supported a conical roller 30 by means of pivot members 31, the inner ends of said rollers being larger than the outer ends, the upright frame members 25 being connected by a cross piece 32 and provided with inwardly extending portions 33 designed to be mounted between the outer ends of the sills 11, as illustrated in Figure 4. The outer ends of the members 26 are provided with curved portions 34, while the outer ends of the members 27 terminate in downwardly and outwardly inclined plates 35, the inner edges of said plates being provided with upwardly extending and diverging flanges 36, the outer edge of the under surface of each of the plates 35 being provided with a notch 37. The members 25 are spaced apart in such a manner that one member of the standard coupler 38 may be supported between them. The rider guide device comprises a frame member 39 having at each end parallel plates 40 adapted to connect between the sills 11. Each end of the member 39 is also provided with outwardly extending members 41, hereinafter termed "horns," supported parallel to each other and having their upper and lower edges provided with beveled portions 42 designed to be supported between corresponding upper and lower rollers 30, as illustrated in Figures 1 and 3.

As will be seen from Figure 4, the rider device is supported on the highway end of the car frame, while the carrier guide is carried by the railway end of the car frame, the coupler device 38 being mounted by means not illustrated and in the usual manner, with the links 43 supported below the members 32 and 39. This coupler forms no part of my present invention except to show a means for coupling the two cars together. Any coupler device may be employed as long as the pivots of the coupling elements are located between the two sets of rollers 30, substantially in the position illustrated in Figure 4.

By this arrangement it will be seen that if two uncoupled cars are moved toward each other, then the outer ends of the horns 41 will engage the lower edges of the inclined plates 35. Further movement of the cars toward each other will cause the free ends of the horns 41 to be moved in position between the corresponding upper and lower rollers 30, the flanges 36 tending to guide the horns laterally, the weight of the horns resting on the lower rollers 30, and at the same time the elements of the automatic coupler 38 may be connected, the horns 41 being of considerable length to permit a considerable amount of telescopic action between the two guide devices to permit relative movement of the coupled cars, due to yielding coupling means. The horns 41 are of such dimensions that a slight amount of lateral play may take place between the horns and the rollers 30 and also permit the mounted end of the rider element to swing laterally in a horizontal plane about a vertical axis extending through the center of the coupling element, to permit the cars to pass over curved tracks, at which time the tires 20 are slid laterally a slight distance over the rails. This is permitted due to the fact that a portion of the weight of the highway end of the car is carried by the carrier guide element and a portion by the springs 21, the device being so constructed that the friction between the tire and the rail, due to lateral movement, is sufficient to reduce the inherent and lateral oscillations.

Sometimes it is desired to connect the carrier element to the rear end of a highway truck, in which case it is necessary to provide an auxiliary coupling device to be used in connection with the coupling element carried by trucks of this type. The device comprises a plate 44 having on its under surface a downwardly extending coupling pin 45, and at one end a pair of bars 46, having their outer ends provided with hooks 47, the bars 46 also being provided with lugs 48 designed to enter the notches 37 of the members 35, with the hooks 47 placed over the outer end of the lower pivot members 31, in the manner illustrated in Figures 6 and 7. A latch device 49 is provided for retaining the lugs 48 in said notches and the coupler in operative position on the carrier element 22 when the device is uncoupled from the tractor, a handle 50 being provided for lifting the auxiliary coupler to operative position, the pin 45 being mounted in the coupler element 51 of a truck 52. The rear end of the truck frame 52 may be provided with inclined plates 53, by means of which the rear end of the trailer may be elevated into operative position by moving the trailer and the truck toward each other.

It will readily be seen that the traction gears must be mounted near the ends of the car frame in order to limit the pivotal angle of the connected cars so as to limit the lateral movement of the tires 20 relative to the rails on which they are supported and to prevent too much overhanging weight carried by the ends of the cars to limit the vertical oscillations due to the vertical momentum.

In actual practice, means in addition to that shown is provided for lifting the ends of the cars, such as is disclosed in my co-pending application Serial No. 3,163, filed January 23, 1935. Under certain conditions the inclined plates 35 serve as means for lifting the load, while the members 53 serve to lift the load when the device is attached to a tractor truck.

From the foregoing it will be noted that the horns 41 will have freedom to swing in a straight line as the cars go around any allowable railroad curves which are of very small angle, the pivots of the upper rollers 30 being necessarily in alignment with the lower rollers, which will allow a degree of pivotal turning of the two cars on the pivot center of the coupler, the distance between the pivot centers of one set of rollers from the pivot of the coupler being the same as a corresponding set of rollers carried by the other car, so that the highway wheels will be guided to follow the arc made by the rail wheels on true curves and the lateral movement of the tires 20 relative to the rails due to traveling over parabolic curves will be so slight as to be taken up by the width of the tire tread of the highway wheel. Therefore, the highway wheels may be caused to follow the rails without flanges being provided for the same.

Thus, it will be seen I have provided a simple guiding and coupling means for trailers of the type above described, and in connection therewith simple means for preventing excess lateral oscillations of the pivoted ends of the car to relieve the wheel flanges of undue strain and wear on the railway wheels when the cars are connected in articulation, and wherein excess vertical oscillation of the car may be reduced by the highway wheels trailing on the rails with a different type of spring for supporting the highway wheels from that employed in the mobile support to which the trailer is attached. Also it will be seen I have provided for an auxiliary means whereby auto tractors with any type of coupling means may be employed to remove the car from the railway track to the highway, provided my auxiliary adapter with that particular type of coupling means is at hand for attachment to that particular make of auto tractor or trailer hitch.

It will be seen further that I have accomplished an additional economic saving in original cost of my trailer by avoiding the use of more expensive hoisting means to elevate the highway wheels clear of the track in use on the rails.

I claim:

1. The combination of a pair of cars supported end to end, carrier means supported by one of the adjacent ends of said cars, rider means supported by the adjoining end of the other car, means supported by said carrier means for movably supporting said rider means to move longitudinally relative to the carrier means and for supporting a portion of the weight of the said end of said other car, and a yieldable coupling to operatively connect said cars.

2. The combination of a pair of car frames having adjacent carrier and rider ends to couple the cars together in articulation, means yieldably supporting the rider end of one of said cars by its corresponding wheels so that said car will carry a portion of the weight of said rider end to hold said wheels in frictional contact with the traction surface and against transverse movement to dampen free and transverse oscillations of the coupled ends of said cars.

3. A pair of car frames each equipped with railway wheels at one end and highway wheels at the other end, means coupling the adjacent ends of said cars, rollers mounted on that end of each car equipped with railway wheels, guide horns attached to the end of each car having highway wheels adapted to be carried by and to cooperate with said rollers, and means for elevating the last said end of the coupled cars as they are moved one toward the other with said horns resting on said rollers to support the cars in articulation.

4. A pair of car frames each equipped with railway wheels at one end and highway wheels at the other end, means coupling the adjacent ends of said cars, rollers mounted on that end of each car equipped with railway wheels, guide horns attached to the end of each car having highway wheels adapted to be carried by and to cooperate with said rollers, means for elevating the last said end of the coupled cars as they are moved one toward the other with said horns resting on said rollers to support the cars in articulation, and means for guiding said horns against transverse movement relative to said rollers.

5. A pair of car frames, each equipped with railway wheels at one end and highway wheels at the other end, a carrier including weight-supporting and conical guiding rollers supported by the end of each car equipped with railway wheels, a rider, including outwardly projecting horns supported by the end of each frame equipped with highway wheels, each horn having a beveled face to co-operate with a corresponding roller, said carrier also having inclined faces leading to said rollers whereby the horns may be guided to engage said rollers as the adjoining ends of said frames equipped with railway and highway wheels are coupled together, and means for coupling said car frames.

6. The combination of a car frame having a set of railway wheels for railway use, near one end, a set of highway wheels near the other end of said frame, for highway use, means for yieldably supporting the last named end of said frame on said highway wheels, a mobile support having a carrier member, a standard type of coupling device connecting said mobile support to said car frame, and a rider provided on the end of the frame having highway wheels adapted to be supported by said carrier member for supporting a portion of the weight of the last named end of the car frame and for guiding the highway wheels to travel in the tracks of the mobile support as they travel over curved paths.

7. In combination, two highway and railway trailer cars each supported by railway wheels at one end and yieldably mounted highway wheels at the other end, means coupling said cars with the railway wheels of one car adjacent to the highway wheels of the other car, carrier and rider means on the respective adjoining ends of said cars for supporting the cars in articulation so that the railway wheels of the said one car may carry a part of the weight on the highway wheels of the said other car, whereby the highway wheels mounted on said last named car may act as means for reducing harmonic spring surging of the first named car, and means carried by the coupled ends of said cars slidably and pivotally securing the carrier and rider means against lateral movement one relative to the other for guiding the highway wheels to follow in an arc inscribed by the railway wheels.

8. In combination, a pair of adjacent road and railway cars each yieldably supported by railway wheels at one end and highway wheels at the other end, means for coupling said cars together in articulation with a portion of the weight carried by the coupled end having the highway wheels carried by the other coupled end having the railway wheels, with the highway wheels resting on the tracks to carry the other portion of said weight to reduce vertical and lateral oscillations of the coupled ends of said cars.

9. A pair of car frames each equipped with railway wheels at one end, highway wheels at the other end, means carried by the wheels for yieldably supporting said frames, standard type of automatic couplers for coupling the end having railway wheels, of one car, to the end having highway wheels, of the other car, means for supporting said cars in articulation, comprising carrier means including pairs of conical rollers supported on opposite sides of said couplers, the rollers of each pair being spaced apart and one above the other, a rider element including a pair of spaced horns projecting outwardly from the said end of each frame having highway wheels, each horn having beveled faces supported to move longitudinally between corresponding pair of said rollers, said rider supporting a portion of the weight of that end of said car having highway wheels and also serving as means for guiding the last said wheels to follow substantially in the path of the railway wheels.

10. A pair of car frames each equipped with railway wheels at one end, highway wheels at the other end, means carried by said wheels for yieldably supporting said frames, standard automatic couplers for coupling the end having railway wheels, of one car, to the end of the other car having highway wheels, means supporting said cars in articulation, comprising carrier means including pairs of rollers supported on opposite sides of said couplers, the rollers of each pair being spaced apart and one above the other, a rider element including a pair of spaced horns projecting outwardly from the said end of each frame having highway wheels, each horn being supported to move longitudinally between corresponding pairs of rollers, said rider supporting a portion of the weight of the end of said car having highway wheels and also serving as means for guiding the wheels of the last said end to follow substantially in the path of the railway wheels.

11. In combination, a pair of adjacent road and railway cars each supported by rail wheels at one end and highway wheels at the other end, means yieldably supporting the ends of said cars having highway wheels to move vertically, means for coupling said cars together in articulation with the coupled end of the car having highway wheels carried by the adjoining end of the other car having rail wheels, with the highway wheels resting on the traction surface to carry a small portion of the weight of the coupled end of the car having highway wheels, to reduce vertical and lateral oscillations of the coupled ends of said cars.

12. The combination of a pair of car frames provided with the usual pivoted coupling element at each end, each frame having a set of railway wheels for railway use, near one end, a set of highway wheels near the other end of said frame, for highway use, means for yieldably supporting one end of each frame on its corresponding highway wheels, carrier and rider means provided on the respective and adjacent ends of said cars for supporting them in articulation when coupled together, means pivoting said carrier and rider means together whereby the two cars may be connected in a limited pivotal manner to guide the highway wheels along the arcs traversed by the railway wheels, with a portion of the weight of the end of the frame provided with highway wheels, carried by said highway wheels, and a portion carried by the said end supported by the railway wheels, to limit free transverse oscillations of the said coupled ends.

13. In combination, a pair of cars adapted to be coupled in articulation, mounted end to end, each end of each car being provided with a pair of supporting wheels, means coupling said cars together, means supporting a portion of the weight at one end of one car by the adjoining end of the other car, and means for yieldably carrying the remaining portion of the weight at the said end of the one said car by the wheels at the said end of the one said car.

14. The combination of a pair of cars supported end to end, each car having carrier wheels near its ends, carrier means supported by one of the adjacent ends of said cars, rider means supported by the adjoining end of the second car, means supported by said carrier means for movably supporting said rider means to move longitudinally relative to the carrier means and for supporting a part of the weight of the said adjoining end of the second car, and a standard railway coupling to operatively connect said cars, said carrier and rider means being pivotally connected against transverse movement one relative to the other, to permit the said adjoining end of the second car to be guided transversely whereby its corresponding wheels will be caused to follow the tracks of the said one end of the said first car.

15. In combination, a pair of car frames, wheels supporting one end of each of said frames, wheels supporting the other end of each of said frames, said wheels being mounted intermediate the ends of said car frames to provide overhanging ends, means coupling the overhanging ends of said frames together with the said one end of one frame adjacent to the said other end of the second frame, means carried by the said other end of the second frame for supporting the said one end of the first frame in articulation, and yieldable means supporting the said one end of the first car frame whereby a portion of the weight of the said one end of the first car frame will be carried by its corresponding wheels and whereby the last said wheels will be caused to travel in the path of the corresponding wheels of the second frame around curves.

16. The combination of a pair of articulated cars each having a pair of supporting wheels near each end and having their respective adjoining ends provided one with a carrier means and the other with a rider slidably mounted on said carrier to carry a large portion of the weight of its corresponding end of said car to permit movement of one of said cars toward and from the other, means yieldably supporting the said end having a rider by its corresponding wheels so that said wheels will support the other portion of the weight of the last said end, and to hold its corresponding wheels in frictional contact with the traction surface and against transverse movement, to dampen free and transverse oscillations of the coupled ends of said cars, means carried by the carrier for guiding the said end of the car having a rider transversely and relative to the end having the carrier, to cause said supporting wheels on the end having the rider to follow substantially in the tracks of the said end having a carrier.

17. A plurality of road and railway cars each supported by highway wheels at one end and railway wheels at the other end, means coupling said cars together in articulation to form a train with a portion of the weight of those ends of each of said cars having highway wheels carried by those ends of each of the adjoining cars having railway wheels, and the other portion of said weight carried by said highway wheels, and means for guiding the highway wheels to follow the tracks of the highway wheels.

18. A plurality of road and railway cars each supported by highway wheels at one end and railway wheels at the other end, means coupling said cars together in articulation, including rigid means supporting a portion of the weight of the ends of said cars having highway wheels, by the ends of the adjoining cars having railway wheels, and means carrying the other portion of said weight means by said highway wheels, and means for limiting the transverse oscillation of said rigid member.

19. A plurality of road and railway cars each supported by highway wheels at one end and railway wheels at the other end, and means coupling said cars together in articulation, including rigid means supporting a portion of the weight of the ends of said cars having highway wheels, by the ends of the adjoining cars having railway wheels, and the other portion of said weight carried by said highway wheels.

20. In combination, a pair of road and rail cars provided with railway wheels for railway use and highway wheels for highway use, pivoted means coupling said cars together, co-operating carrier and rider means on the adjacent ends of the cars to mount them in articulation, the weight of the rider means being supported by the carrier means by means of bearings spaced from and on opposite sides of the pivot of said coupler; whereby each side of the end of said car having the rider means may be independently supported to reduce its tendency to oscillate or tilt about a horizontal and longitudinal axis near said points of support.

21. A plurality of cars arranged end to end, each being provided with a carrier means at one end and a rider means at the other end, pivoted means coupling the adjacent ends of said cars together with the end of each car having a rider means carried by the carrier end of its adjacent car, the weight of the rider means being supported by the carrier means by means of bearings spaced from and on opposite sides of the pivot of said coupler; whereby the ends of said cars having rider means will be supported against tilting movement relative to the adjacent ends of the cars having carrier means, about a horizontal and longitudinal extending axis to prevent oscillations of one of said carrier ends of said car being transmitted to a plurality of other cars coupled in a train.

22. In combination, two highway and railway trailer cars each supported by railway wheels at one end and yieldably mounted highway wheels at the other end, pivoted means coupling said cars with the railway wheels of one car adjacent to the highway wheels of the other car, carrier and rider means on the respective adjoining ends of said cars for supporting the cars in articulation so that the railway wheels of the said one car may carry a part of the weight on the highway wheels of the said other car and for guiding said highway wheels to travel in the tracks of the adjoining railway wheels, the weight of the rider means being supported by the carrier means by means of bearings spaced from and on opposite sides of the pivot of said coupler whereby each side of the end of said car having the rider means may be independently supported to reduce its tendency to oscillate and tilt about a horizontal and longitudinal axis.

GEORGE T. RONK.